United States Patent
Zhang et al.

(10) Patent No.: US 12,113,236 B2
(45) Date of Patent: *Oct. 8, 2024

(54) EXHAUST FILTER SYSTEM FOR BATTERY PACK

(71) Applicant: Yantai Chungway New Energy Technology Co., Ltd., Yantai (CN)

(72) Inventors: Lilei Zhang, Yantai (CN); Hongbo Chang, Yantai (CN); Yechao Tan, Yantai (CN); Yunqi Liu, Yantai (CN)

(73) Assignee: Yantai Chungway New Energy Technology Co., Ltd., Yantai (CN)

( * ) Notice: Subject to any disclaimer, the term of this patent is extended or adjusted under 35 U.S.C. 154(b) by 194 days.

This patent is subject to a terminal disclaimer.

(21) Appl. No.: 17/620,709

(22) PCT Filed: Aug. 27, 2020

(86) PCT No.: PCT/CN2020/111818
§ 371 (c)(1),
(2) Date: Dec. 19, 2021

(87) PCT Pub. No.: WO2022/041062
PCT Pub. Date: Mar. 3, 2022

(65) Prior Publication Data
US 2022/0407177 A1 Dec. 22, 2022

(51) Int. Cl.
*H01M 10/00* (2006.01)
*B60L 50/64* (2019.01)
(Continued)

(52) U.S. Cl.
CPC .......... *H01M 50/394* (2021.01); *B60L 50/64* (2019.02); *H01M 50/30* (2021.01); *H01M 50/35* (2021.01);
(Continued)

(58) Field of Classification Search
CPC .. H01M 50/394; H01M 50/35; H01M 50/358; H01M 50/383; H01M 2220/20; B60L 50/64
See application file for complete search history.

(56) References Cited

U.S. PATENT DOCUMENTS

| 3,614,987 A | 10/1971 | Bonne et al. |
| 11,541,258 B2 * | 1/2023 | Zhang ...................... A62C 3/06 |

(Continued)

FOREIGN PATENT DOCUMENTS

| CN | 203400596 U | 1/2014 |
| CN | 109103392 A | 12/2018 |

(Continued)

OTHER PUBLICATIONS

Machine translation of CN-110478831-A, obtained from PE2E. (Year: 2019).*

(Continued)

*Primary Examiner* — Nicholas P D'Aniello
(74) *Attorney, Agent, or Firm* — Chungway IP

(57) ABSTRACT

Disclosed is an exhaust filter system for a battery pack, including an explosion-proof valve and a filter apparatus. One end of the explosion-proof valve is connected to a battery pack- and the other end is connected to the filter apparatus. The filter apparatus includes an introduction port, a discharge port, a housing, and a filter mechanism. The introduction port and the discharge port are separately disposed at two ends of the housing. The filter mechanism is disposed inside the housing and is provided with a plurality of filter holes. The present invention has the following beneficial effects: by optimal design of a novel explosion-proof valve and a novel filter apparatus, expanding the applicability of technical solutions of this application, solving the problem of fire induced by thermal runaway, exhausting combustion gas more smoothly, and achieving (Continued)

better effects of filtering and post handling for thermal runaway in a battery pack.

14 Claims, 4 Drawing Sheets

(51) Int. Cl.
 *H01M 50/30* (2021.01)
 *H01M 50/35* (2021.01)
 *H01M 50/383* (2021.01)

(52) U.S. Cl.
 CPC ...... *H01M 50/383* (2021.01); *H01M 2220/20* (2013.01)

(56) References Cited

U.S. PATENT DOCUMENTS

2013/0115533 A1* 5/2013 Friesen ................. H01M 50/30
 429/409
2021/0331011 A1* 10/2021 Geissler ................. B60L 50/64
2022/0140432 A1* 5/2022 Chen ................. H01M 50/3425
 429/53

FOREIGN PATENT DOCUMENTS

| | | | |
|---|---|---|---|
| CN | 110478831 A | 11/2019 | |
| RU | 199162 U1 * | 8/2020 | ............... A62C 4/00 |
| WO | WO-2023072522 A2 * | 5/2023 | .......... H01M 50/367 |

OTHER PUBLICATIONS

Machine translation of RU-199162-U1 obtained from PE2E. (Year: 2020).*

Machine translation of CN-109103392-A obtained from PE2E. (Year: 2018).*

USPTO, Office Action in U.S. Appl. No. 17/133,116, filed Jun. 22, 2022, 9 pages.

* cited by examiner

EXHAUST FILTER SYSTEM FOR BATTERY PACK

TECHNICAL FIELD

The present invention relates to the field of thermal runaway technology for battery packs, and specifically relates to an exhaust filter system for a battery pack.

BACKGROUND

Three mandatory national standards (referred to as "three mandatory standards" for short hereinafter), namely, GB 18384-2020 Electric Vehicles Safety Requirements, GB 38032-2020 Electric Bus Safety Requirements, and GB 30381-2020 Safety Requirements for Power Batteries for Electric Vehicles, formulated by the Ministry of Industry and Information Technology of the People's Republic of China on May 12, 2020 were approved and published by the State Administration for Market Regulation and the Standardization Administration of China and will come into effect from Jan. 1, 2021.

The three mandatory standards mandatorily stipulate that there shall be no fire or explosion in a battery system within five minutes after thermal runaway occurs in a battery cell to ensure a safe egress time for passengers, imposing a higher requirement for the safety of new energy vehicles. The suppression of thermal runaway in ternary batteries satisfies requirements of the three mandatory standards and becomes a difficult issue that urgently needs to be resolved in the field of new energy vehicle safety.

In existing technical solutions of post handling for thermal runaway, for example, exhaustion is performed by an exhaust pipe alone, or an exhaust pipe and an explosion-proof valve are combined, or an exhaust pipe and a filter apparatus are combined, wherein the filter apparatus uses a neutralizer or adsorbent (a coarse particle separation layer, an active carbon layer, a potassium permanganate layer, an activated alumina layer, a particulate filter layer, etc.) to filter combustion gas. In the foregoing technical solutions of handling, the technical solution including a filter apparatus has a relatively better handling effect in practice, but there is also restriction in this technical solution. When the battery capacity is small (e.g. 20 Ah) and thermal runaway reaction is smooth, this technical solution can exhibit a filter effect. However, when thermal runaway occurs in a cell having a large capacity (e.g. greater than 40 Ah), especially when a large amount of combustion gas is generated in a ternary battery, the combustion is intense and the pressure of the exhausted combustion gas becomes very large, the filter method using a neutralizer or adsorbent will greatly impede the discharge of combustion gas, which causes excessive pressure and damage in the filter apparatus or even bursts in the box body of a power battery pack, and the burning solid particles will eject at burst positions and ignite the ejected combustible gas, leading to rapid spread of fire.

Therefore, how to perform post handling for thermal runaway of high-capacity batteries or battery modules is a problem that requires urgent research of persons skilled in the art, to ensure that the large amount of combustion gas generated instantly is smoothly exhausted, thereby avoiding damages to the structure of the filter apparatus or even the battery pack.

SUMMARY

An objective of the present invention is to provide an exhaust filter system for a battery pack to overcome the deficiencies in the prior art. By optimal design of a novel explosion-proof valve and a novel filter apparatus, the applicability of technical solutions of this application is made more extensive. The problem of fire induced by thermal runaway can be satisfactorily solved for both high-capacity batteries and small-capacity batteries. Combustion gas is exhausted more smoothly, and a better filtering effect and a better effect on post handling for thermal runaway in a battery pack are obtained.

The objective of the present invention is achieved by using the following technical measure: an exhaust filter system for a battery pack, including an explosion-proof valve and a filter apparatus, where one end of the explosion-proof valve is connected to a battery pack, the other end of the explosion-proof valve is connected to the filter apparatus, the filter apparatus includes an introduction port, a discharge port, a housing, and a filter mechanism, the introduction port and the discharge port are separately disposed at two ends of the housing, the filter mechanism is disposed inside the housing, and the filter mechanism is provided with a plurality of filter holes.

Further, the filter mechanism includes a first filter plate unit and a second filter plate unit, wherein the first filter plate unit and the second filter plate unit are separately disposed on two sides of the filter mechanism in a conveyance direction; the first filter plate unit includes at least two first filter plates disposed at an interval, the second filter plate unit includes at least two second filter plates disposed at an interval; in the conveyance direction of the filter mechanism, the at least two first filter plates are arranged in descending order of hole diameters of the filter holes, and the at least two second filter plates are arranged in descending order of hole diameters of the filter holes.

Further, in the conveyance direction perpendicular to the filter mechanism, a gap is provided between the first filter plates and the closest second filter plate, and the gap is used for the passage of combustion gas during thermal runaway in the battery pack.

Further, a sum of a ventilation area of the holes in a single first filter plate, a ventilation area of the holes in an adjacent second filter plate and an effective ventilation area of a single gap forms a single-layer ventilation area of the filter mechanism, and the single-layer ventilation area is greater than a cross-sectional area of the introduction port.

Further, the effective ventilation area of the gap is greater than the cross-sectional area of the introduction port.

Further, an included angle is formed between the first filter plate and a side wall of the housing in a length direction, the included angle is greater than 0° and smaller than 180°. The ventilation area of the first filter plate is greater than the cross-sectional area of the introduction port. An included angle is formed between the second filter plate and the side wall of the housing in the length direction, and the included angle is greater than 0° and smaller than 180°. The ventilation area of the second filter plate is greater than the cross-sectional area of the introduction port.

Further, a minimum diameter of the filter holes is less than 0.428 mm.

Further, the first filter plate adjacent to the introduction port completely covers a linear combustion gas passage of the introduction port.

Further, in the conveyance direction of the filter mechanism, the hole centers of the filter holes in two longitudinally adjacent first filter plates are arranged in an unaligned manner, and the hole centers of the filter holes in two longitudinally adjacent second filter plates are arranged in an unaligned manner.

Further, the exhaust filter system for a battery pack further includes an exhaust pipe, and the exhaust pipe is used for connecting the explosion-proof valve with the filter apparatus.

Further, the exhaust pipe is made of a material that withstands high pressure and high temperature.

Further, the exhaust pipe is made of stainless steel.

Further, a cross-sectional area of the exhaust pipe is smaller than or equal to a cross-sectional area of the filter apparatus.

Further, the exhaust filter system for a battery pack further includes a fire coupling, and the fire coupling is connected to the discharge port of the filter apparatus.

Further, the explosion-proof valve includes a frame, a seal gasket, and a waterproof breathable film, wherein the seal gasket and the waterproof breathable film are separately disposed on the frame, the seal gasket is used for a sealed connection between the explosion-proof valve and the battery pack, and the waterproof breathable film is used for pressure relief during thermal runaway in the battery pack.

Compared with the prior art, the beneficial effects of the present invention are as follows. An exhaust filter system for a battery pack makes the applicability of technical solutions of this application more extensive by optimal design of a novel explosion-proof valve and a novel filter apparatus. The problem of fire induced by thermal runaway can be satisfactorily solved for both high-capacity batteries and small-capacity batteries. Combustion gas is exhausted more smoothly, and a better filtering effect and a better effect on post handling for thermal runaway in a battery pack are obtained. Specifically, after the waterproof breathable film of the explosion-proof valve is exploded, combustion gas is exhausted smoothly and pressure is relieved without hindrance, and water can be smoothly input to the battery pack after connection of the fire coupling. In the novel filter apparatus, the first filter plate unit and the second filter plate unit are used to implement double filtering. The first filter plates and the second filter plates are arranged in a staggered manner to implement baffle filtering. Filter holes of a plurality of first filter plates or a plurality of second filter plates are arranged in an unaligned manner to implement baffle filtering one more time. The cross-sectional area of the exhaust pipe is smaller than or equal to the cross-sectional area of the filter apparatus to ensure pressure relief of high-pressure combustion gas generated instantly. The single-layer ventilation area is greater than the cross-sectional area of the introduction port, which is the first way to ensure smooth discharge of combustion gas. The ventilation area of holes in a single first filter plate or a single second filter plate is greater than the cross-sectional area of the introduction port, which is the second way to ensure smooth discharge of combustion gas. The effective ventilation area of the gap is greater than the cross-sectional area of the introduction port, which is the third way to ensure smooth discharge of combustion gas. By the three ways above, high-pressure combustion gas can be prevented from being blocked in the filter apparatus no matter the filter holes are partially or completely blocked, thereby effectively avoiding damage or explosion of the battery pack or the filter apparatus. The filter plates are arranged in descending order of hole diameters in the combustion gas conveyance direction, and thus solid particles, sparks and the like can be thoroughly filtered.

The present invention is described below in detail with reference to the accompanying drawings and specific implementations.

Figure 1:
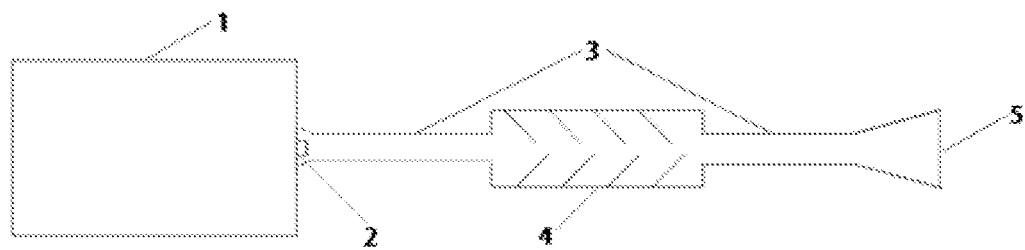
FIG. 1 is a schematic structural diagram of an exhaust filter system for a battery pack.

1. battery pack, 2. explosion-proof valve, 4. filter apparatus, 3. exhaust pipe, 5. fire coupling, 6. discharge port, 7. introduction port, 8. filter mechanism, 9. housing, 10. filter hole, 11. first filter plate unit, 12. second filter plate unit, 13. first filter plate, 14. second filter plate, 15. frame, 16. seal gasket, 17. waterproof breathable film, and 18. bolt hole.

DESCRIPTION OF THE EMBODIMENTS

As shown in FIG. 1 to FIG. 4, an exhaust filter system for a battery pack includes an explosion-proof valve 2 and a filter apparatus 4. One end of the explosion-proof valve 2 is connected to the battery pack 1. The other end of the explosion-proof valve 2 is connected to the filter apparatus 4. The filter apparatus 4 includes an introduction port 7, a discharge port 6, a housing 9, and a filter mechanism 8. The introduction port 7 and the discharge port 6 are separately disposed at two ends of the housing 9. The filter mechanism 8 is disposed inside the housing 9. The filter mechanism 8 is provided with a plurality of filter holes 10. A minimum diameter of the filter holes 10 is less than 0.428 mm. The exhaust filter system of the battery pack 1 further includes an exhaust pipe 3 and a fire coupling 5. The exhaust pipe 3 is used for connecting the explosion-proof valve 2 with the filter apparatus 4. The fire coupling 5 is connected to the discharge port 6 of the filter apparatus 4. A standard fire coupling 5 is used for the fire coupling 5. When thermal runaway occurs, the filter apparatus 4 gains sufficient time for passengers to wait for the arrival of a fire engine, so that firefighters may directly and rapidly connect the hydrant water to the fire coupling 5. The filter holes 10 in the filter mechanism 8 may adequately ensure the release of relatively high explosion pressure, especially the release of a large amount of combustion gas instantly generated by high-capacity batteries and battery modules, to avoid damages to the structure of the filter apparatus 4 or even the battery pack 1. The filter hole 10 may be a long hole, a circular hole, a square hole or the like. The plurality of filter holes in a single first filter plate 13 or a single second filter plate 14 may have consistent diameters or may have inconsistent diameters provided that the hole diameters descend from front to rear.

The filter mechanism 8 includes a first filter plate unit 11 and a second filter plate unit 12. The first filter plate unit 11 and the second filter plate unit 12 are separately disposed on two sides of the filter mechanism 8 in a conveyance direction. The first filter plate unit 11 includes at least two first filter plates 13 disposed at an interval. The second filter plate unit 12 includes at least two second filter plates 14 disposed at an interval. In the conveyance direction of the filter mechanism 8, the at least two first filter plates 13 are arranged in descending order of hole diameters of the filter holes 10. The at least two second filter plates 14 are arranged in descending order of hole diameters of the filter holes 10. Each of the first filter plates 13 is provided with a plurality of filter holes 10. Each of the second filter plates 14 is also provided with a plurality of filter holes 10. The plurality of filter holes 10 in the single first filter plate 13 or the single second filter plate 14 may have the same hole diameter, provided that in the conveyance direction of the filter mechanism 8, the second filter plates 14 arranged in parallel have sequentially descending hole diameters from front to rear and the first filter plates 13 arranged in parallel have sequentially descending hole diameters from front to rear, to implement the gradual filtering of the second filter plate unit 12 or the first filter plate unit 11. A relatively large hole diameter is used for the filter mechanism 8 near the end of the introduction port 7 of the filter apparatus 4, so that large solid particles such as copper foils and plastic pieces from the explosion and combustion of the explosion-proof valve 2 can be stopped. The hole diameter decreases in the conveyance direction toward a distal end. A relatively small hole diameter may be used to filter out small solid particles such as sparks and dust. It is found through experiments of the technology in this application that, more than 95% of solid particles sprayed from thermal runaway in a multi-cell battery have particle sizes greater than 0.428 mm. Therefore, to implement optimal filtering of the filter apparatus 4 to enable exhaust gas to be free of solid particles, in the filter apparatus 4, a hole diameter at the distal end of the conveyance direction is set to less than 0.428 mm. In this way, the filter apparatus 4 can filter out large solid particles, sparks, dust, and the like and can also release relatively high explosion pressure generated from thermal runaway in the battery pack 1, to ensure smooth exhaust of combustion gas.

The at least two the first filter plates 13 are arranged in parallel, and the at least two second filter plates 14 are arranged in parallel. The specific quantity of the first filter plates 13 or the second filter plates 14 may be 3, 4, 5, etc. Regardless of the specific quantity of the first filter plates 13 or the second filter plates 14, the hole diameter of the first filter plate 13 or the second filter plate 14 at the distal end of the filter mechanism 8 in the conveyance direction is less than 0.428 mm. The first filter plates 13 and the adjacent second filter plates 14 are arranged in a staggered manner. That is, one second filter plate 14 is inserted between two adjacent parallel first filter plates 13. However, the second filter plates 14 are disposed on a side opposite the side where the first filter plates 13 are connected to the housing 9, and the second filter plates 14 are not in contact with the first filter plates 13. Further, in the conveyance direction perpendicular to the filter mechanism 8, a gap is provided between the first filter plates 13 and the closest second filter plate 14. The gap is used for the passage of combustion gas during thermal runaway in the battery pack 1.

A sum of a ventilation area of the holes in a single first filter plate 13, a ventilation area of the holes in an adjacent second filter plate 14 and an effective ventilation area of a single gap forms a single-layer ventilation area of the filter mechanism 8, and the single-layer ventilation area is greater than a cross-sectional area of the introduction port 7. The introduction port 7 and the exhaust pipe 3 may have the same diameter, and the introduction port 7 and the exhaust pipe 3 may also have different diameters. In the case of different diameters, if the diameter of the exhaust pipe 3 is greater than that of the introduction port 7, the single-layer ventilation area is correspondingly greater than a cross-sectional area of the exhaust pipe 3; if the diameter of the exhaust pipe 3 is less than that of the introduction port 7, the single-layer ventilation area only needs to be greater than the cross-sectional area of the introduction port 7. Assuming that the single first filter plate 13 or the adjacent second filter plate 14 is provided with 12 holes, then the ventilation area of the holes in the single first filter plate 13 equals to a sum of the hole areas of the 12 holes, the ventilation area of the holes in the adjacent second filter plate 14 equals to a sum of the hole areas of the 12 holes. The single-layer ventilation area equals to a sum of the hole area of the 12 holes on the first filter plate 13 and the hole area of the 12 holes on the second filter plate 14 plus the effective ventilation area of the gap. When the first filter plate 13 and the second filter plate 14 have particular areas, the quantity of holes may be set according to different hole diameters. 12 holes are only an embodiment of the first filter plate 13 or the adjacent second filter plate 14.

Figure 4:
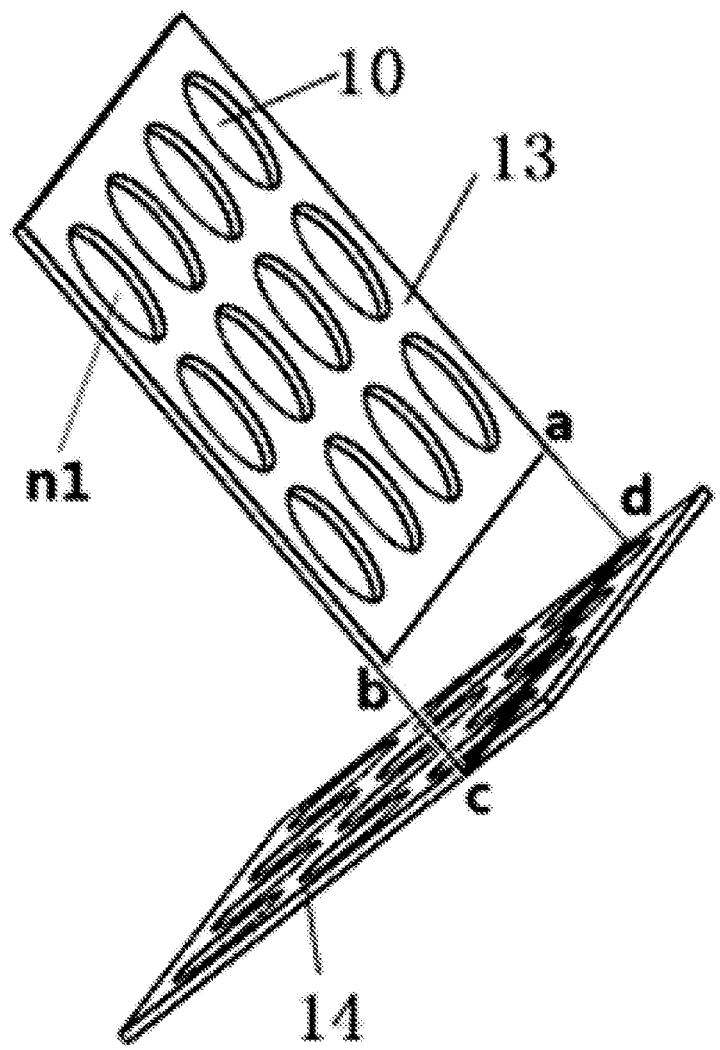
FIG. 4 is a schematic diagram of an effective ventilation area of a gap.

The effective ventilation area of the gap is greater than the cross-sectional area of the introduction port 7. The effective ventilation area refers to a minimum cross-sectional area for combustion gas to pass through the gap. The first filter plate 13 has a bottom side ab in the length direction. The bottom side ab extends to the surface of the second filter plate 14 along the length direction of the first filter plate 13 to form an intersection line cd. The effective ventilation area is a planar area formed by the bottom side ab and the intersection line cd, as shown in FIG. 4.

An included angle $\beta$ greater than 0° and smaller than 180° is formed between the first filter plate 13 and a side wall of the housing 9 in a length direction, and the ventilation area of a single first filter plate 13 is greater than the cross-sectional area of the introduction port 7. An included angle $\beta$ greater than 0° and smaller than 180° is formed between the second filter plate 14 and the side wall of the housing 9 in the length direction, and the ventilation area of a single second filter plate 14 is greater than the cross-sectional area of the introduction port 7. The cross-sectional area of the introduction port 7 is an ejection area of combustion gas. In the design in which the ventilation area of the single second filter plate 14 or the ventilation area of the single first filter plate 13 is greater than the ejection area of combustion gas, the single first filter plate 13 or second filter plate 14 may be used to implement first-stage filtering of ejected combustion gas. When there are a plurality of the first filter plates 13 or the second filter plates 14, multi-stage filtering of ejected combustion gas may be implemented, to ensure a filtering effect.

The first filter plate 13 adjacent to the introduction port 7 completely covers a linear combustion gas passage of the introduction port 7, to increase the effective filtering area for combustion gas of the first filter plate 13. If the first filter plate cannot cover the introduction port, the effective filtering area for combustion gas of the first filter plate 13 is reduced. When the linear combustion gas passage is located between the first filter plate 13 and the adjacent second filter plate 14, that is, a part of combustion gas ejected from the introduction port 7 is filtered by the first filter plate 13, and another part is filtered by the second filter plate 14, and still another part may directly enter the subsequent filter mechanism 8 through the gap. Apparently, in this manner, a part of the filtering areas of the first filter plate 13 and the second filter plate 14 is wasted.

In the conveyance direction of the filter mechanism 8, the hole centers of the filter holes 10 in two longitudinally adjacent first filter plates 13 are arranged in an unaligned manner, and the hole centers of the filter holes 10 in two longitudinally adjacent second filter plates 14 are arranged in an unaligned manner. The hole centers are arranged in an unaligned manner to prevent combustion gas from directly passing through the two adjacent first filter plates 13 and also prevent combustion gas from directly passing through the two adjacent second filter plates 14, to ensure that combustion gas is baffled between the first filter plate unit 11 and the second filter plate unit 12 to implement better filtering.

Figure 5:
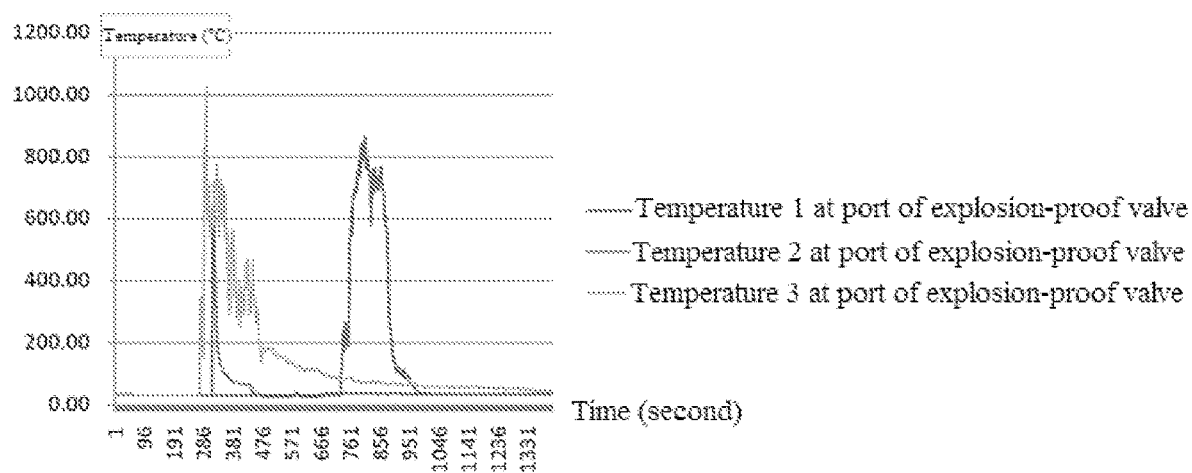
FIG. 5 is a combustion experiment diagram of the explosion-proof valve at the thermal runaway of the 153 Ah ternary battery.

A 153 Ah-ternary battery is used as an example. It is found through experiments that when thermal runaway occurs in the 153 Ah-ternary battery, combustion is intense, and the temperature at the port of the explosion-proof valve 2 is up to 1022.20° C. as shown in FIG. 5. Therefore, for a high-capacity battery, the material of the exhaust pipe 3 for discharging combustion gas needs to be selected, to better satisfy the requirement for combustion gas discharging. In addition, a large amount of combustion gas generated instantly exerts an excessively high pressure. Therefore, it is preferable for the exhaust pipe 3 to be capable of withstanding high pressure. Based on the foregoing characteristics of thermal runaway in high-capacity batteries, the exhaust pipe 3 is preferentially made of stainless steel 304 that withstands high temperature and high pressure. Because stainless steel 304 has excellent characteristics, in the case of meeting the use requirements, the thickness of a tube wall may be smaller, thereby reducing the overall weight of the exhaust filter system and at the same time reducing costs.

The cross-sectional area of the exhaust pipe 3 is smaller than or equal to a cross-sectional area of the filter apparatus 4.

Figure 2:
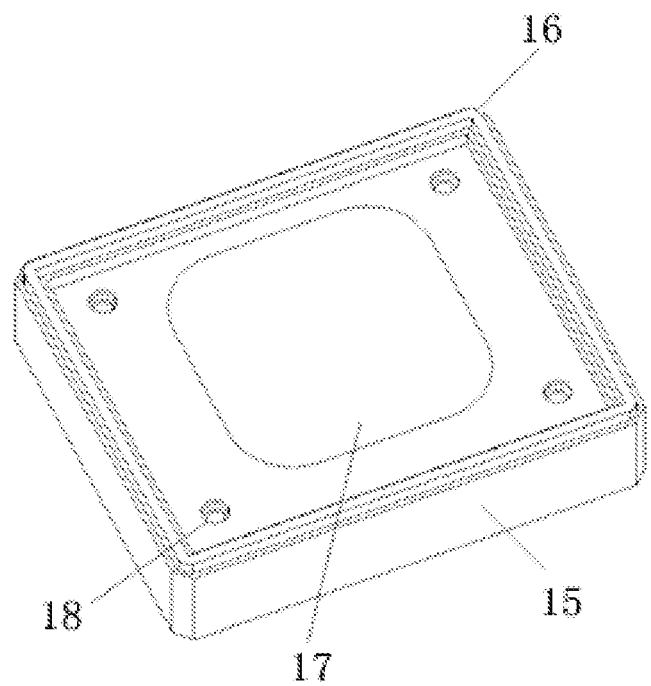
FIG. 2 is a schematic structural diagram of an explosion-proof valve.

As shown in FIG. 2, the explosion-proof valve 2 includes a frame 15, a seal gasket 16, and a waterproof breathable film 17. The seal gasket 16 is disposed at a peripheral edge of the frame 15. A penetrating channel is provided in the middle of the frame 15. The waterproof breathable film 17 used for covering the channel is mounted on the frame 15. The seal gasket 16 is used for a sealed connection between the explosion-proof valve 2 and the battery pack 1. The waterproof breathable film 17 is used for pressure relief during thermal runaway in the battery pack 1. The peripheral edge of the frame 15 is provided with at least two bolt holes 18. The explosion-proof valve 2 is connected to the battery pack 1 by the at least two bolt holes 18. The housing 9 of the battery pack 1 is provided with a through hole. There is at least one through hole. The area of the through hole matches that of the waterproof breathable film 17. The waterproof breathable film 17 can completely cover the through hole. In this application, for the characteristic that a large amount of combustion gas is instantly generated in a high-capacity battery and a battery module, new improvements are made to the existing explosion-proof valve 2. The waterproof breathable film 17 is waterproof and breathable, to adequately maintain pressure balance between the inside and outside of the battery pack 1. During thermal runaway, the waterproof breathable film 17 of the explosion-proof valve 2 is exploded. The channel penetrating in the middle of the frame 15 is opened. Particles from explosion pass through the channel to be smoothly exhausted from the battery pack 1 without hindrance, and the pressure is sufficiently relieved, to ensure the smooth discharge of combustion gas. When there are a plurality of through holes, one explosion-proof valve 2 may be mounted in each through hole, and these explosion-proof valves are jointly connected into the filter apparatus 4 through a corresponding quantity of exhaust pipes. Certainly, one through hole may correspond to one filter apparatus 4.

Figure 3A:
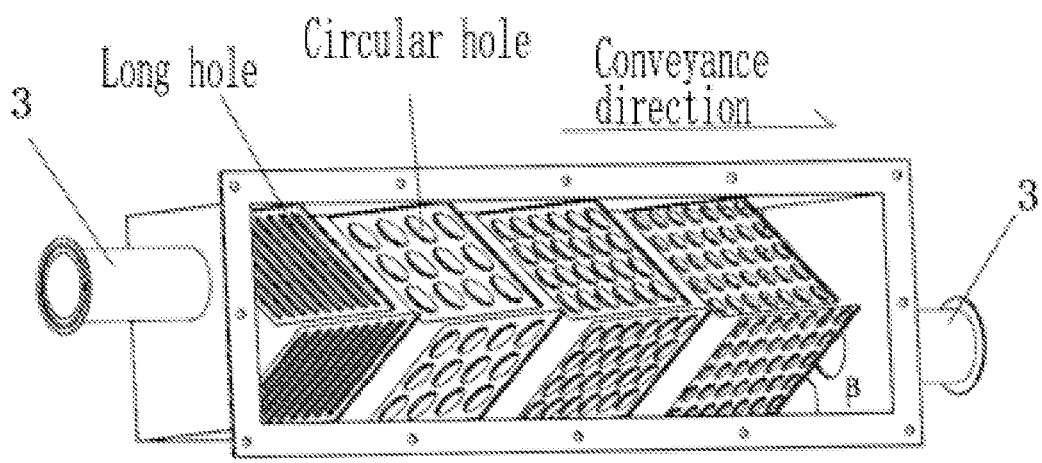
FIG. 3 is a schematic structural diagram of a plurality of embodiments (FIG. 3A to FIG. 3C) of a filter apparatus.

Embodiment 1 of the filter apparatus is shown in FIG. 3A. A pipe on the left side of the filter apparatus 4 is the exhaust pipe 3 of a combustion gas inlet. The inlet is located at a ⅓ position near the top of the filter apparatus 4. The first filter plate unit 11 in the upper layer can cover the linear passage of the combustion gas inlet. A pipe on the right side is the exhaust pipe 3 of a combustion gas outlet. The outlet is located at a ⅓ position near the bottom of the filter apparatus 4. Similarly, the second filter plate unit 12 in the lower layer can cover the linear passage of the combustion gas outlet. The filter holes 10 in the first filter plate 13 at the introduction port 7 is a long hole, and other filter holes 10 are circular holes, so that large copper foils, plastic blocks from the explosion and combustion of the explosion-proof valve 2, the seal gasket 16, and the like can be effectively isolated. The large solid blocks would then slide down to a vacant position at the bottom of the filter apparatus 4. Subsequently, the first filter plate 13 and the second filter plate 14 are provided with filter holes 10 having gradually descending hole diameters, to implement gradual filtering. The filter holes 10 in longitudinally arranged filter plates are arranged in a staggered manner, so that the filtering effect can be effectively enhanced. An included angle ß between the first filter plate 13 and a side wall of the top of the housing 9 in the length direction is 45 degrees, and an included angle ß between the second filter plate 14 and a side wall of the bottom of the housing 9 in the length direction is 45 degrees. The first filter plate 13 and the second filter plate 14 are staggered and perpendicular to each other but are not in contact. A gap is kept between the first filter plate 13 and the second filter plate 14. The effective ventilation area of the gap is not smaller than the cross-sectional area of the exhaust pipe 3, to ensure that the exhaust and pressure relief channel is unimpeded, and the exhaust and pressure relief channel can smoothly exhaust combustion gas even if the first filter plate 13 and the second filter plate 14 are completely blocked by solid particles.

Figure 3B:
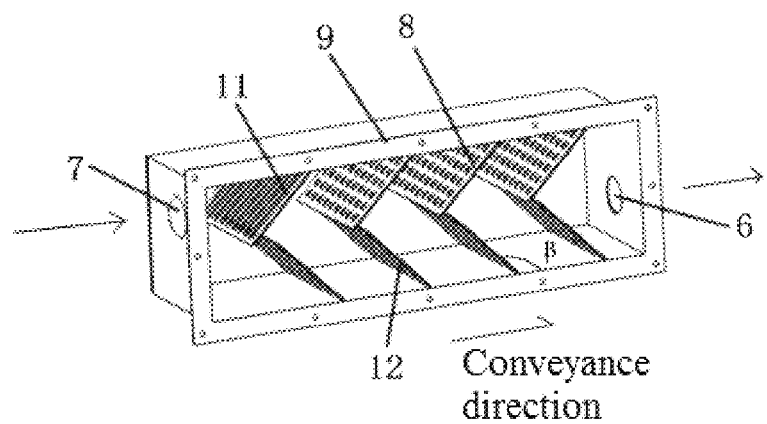

Embodiment 2 of the filter apparatus is shown in FIG. 3B. An arrangement angle between the first filter plate 13 and the second filter plate 14 is 135°, solid particles are filtered, and combustion gas is smoothly exhausted. For the filter holes 10, a combination of long holes and circular holes is adopted.

Figure 3C:
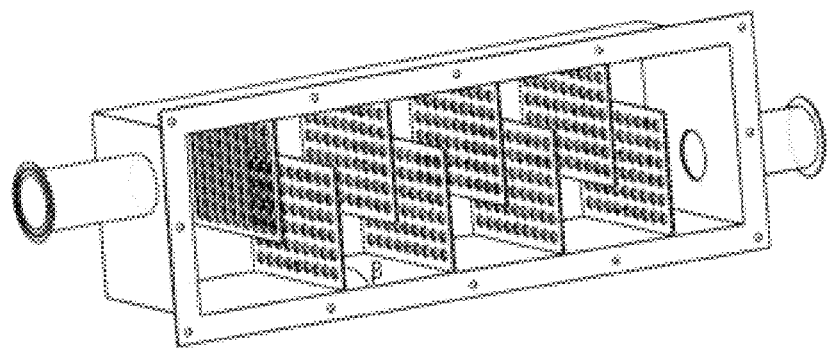

Embodiment 3 of the filter apparatus is shown in FIG. 3C. The first filter plate 13 and the second filter plate 14 are vertically arranged in a staggered manner. An included angle between the first filter plate 13 or the second filter plate 14 and a side wall of the housing 9 in the length direction is 90 degrees, and solid particles can also be effectively isolated and filtered, and combustion gas can be smoothly exhausted. The filter holes 10 are all circular holes.

A pressure relief and exhaust process is as follows. The waterproof breathable film 17 of the explosion-proof valve 2 explodes under the effect of a large amount of combustion gas generated from thermal runaway in the battery pack 1. The combustion gas flows through the channel in the explosion-proof valve 2 and enters the filter apparatus 4 along the exhaust pipe 3. The pressure of the combustion gas is reduced inside the housing 9 of the filter apparatus 4. With the multi-stage filtering of the first filter plate unit 11 and the second filter plate unit 12, the combustion gas is baffled and filtered. After thorough filtering without blockage, the combustion gas is eventually exhausted by the fire coupling 5. When a fire engine is connected to the fire coupling 5, water enters the filter apparatus 4 from the fire coupling 5, flows through the filter holes 10 and the gap in the filter apparatus 4 to enter the channel in the explosion-proof valve 2, and eventually enters the battery pack 1 to reduce the temperature and extinguish the fire.

A person skilled in the art should understand that, the present invention is not limited to the foregoing embodiments. The foregoing embodiments and description in the specification only describe the principles of the present invention. The present invention may be modified and improved in various ways without departing from the spirit or scope of the present invention, and these modifications and improvements fall within the claimed scope of the present invention. The scope claimed by the present invention is defined by the appended claims and their equivalents.

What is claimed is:

1. An exhaust filter system for a battery pack, comprising an explosion-proof valve and a filter apparatus, wherein one end of the explosion-proof valve is connected to a battery pack, the other end of the explosion-proof valve is connected to the filter apparatus, the filter apparatus comprises an introduction port, a discharge port, a housing, and a filter mechanism, the introduction port and the discharge port are separately disposed at two ends of the housing, the filter mechanism is disposed inside the housing, and the filter mechanism is provided with a plurality of filter holes, and wherein the filter mechanism comprises a first filter plate unit and a second filter plate unit, the first filter plate unit and the second filter plate unit are separately disposed on two sides of the filter mechanism in a conveyance direction, the first filter plate unit comprises at least two first filter plates disposed at an interval, the second filter plate unit comprises at least two second filter plates disposed at an interval, in the conveyance direction of the filter mechanism, the at least two first filter plates are arranged in descending order of hole diameters of the filter holes, and the at least two second filter plates are arranged in descending order of hole diameters of the filter holes.

2. The exhaust filter system for a battery pack according to claim 1, wherein in the conveyance direction perpendicular to the filter mechanism, a gap is provided between the first filter plates and the closest second filter plates, and the gap is used for the passage of combustion gas during thermal runaway in the battery pack.

3. The exhaust filter system for a battery pack according to claim 2, wherein a sum of a ventilation area of the holes in a single first filter plate, a ventilation area of the holes in an adjacent second filter plate and an effective ventilation area of a single gap forms a single-layer ventilation area of the filter mechanism, and the single-layer ventilation area is greater than a cross-sectional area of the introduction port.

4. The exhaust filter system for a battery pack according to claim 2, wherein the effective ventilation area of the gap is greater than the cross-sectional area of the introduction port.

5. The exhaust filter system for a battery pack according to claim 2, wherein an included angle is formed between the first filter plate and a side wall of the housing in a length direction, the included angle is greater than 0° and smaller than 180°, the ventilation area of the first filter plate is greater than the cross-sectional area of the introduction port, an included angle is formed between the second filter plate and the side wall of the housing in the length direction, the included angle is greater than 0° and smaller than 180°, and the ventilation area of the second filter plate is greater than the cross-sectional area of the introduction port.

6. The exhaust filter system for a battery pack according to claim 1, wherein a minimum diameter of the filter holes is less than 0.428 mm.

7. The exhaust filter system for a battery pack according to claim 1, wherein the first filter plate adjacent to the introduction port completely covers a linear combustion gas passage of the introduction port.

8. The exhaust filter system for a battery pack according to claim 1, wherein in the conveyance direction of the filter mechanism, the hole centers of the filter holes in two longitudinally adjacent first filter plates are arranged in an unaligned manner, and the hole centers of the filter holes in two longitudinally adjacent second filter plates are arranged in an unaligned manner.

9. The exhaust filter system for a battery pack according to claim 1, wherein the exhaust filter system for a battery pack further comprises an exhaust pipe, and the exhaust pipe is used for connecting the explosion-proof valve with the filter apparatus.

10. The exhaust filter system for a battery pack according to claim 9, wherein the exhaust pipe is made of a material that withstands high pressure and high temperature.

11. The exhaust filter system for a battery pack according to claim 10, wherein the exhaust pipe is made of stainless steel.

12. The exhaust filter system for a battery pack according to claim 9, wherein a cross-sectional area of the exhaust pipe is smaller than or equal to a cross-sectional area of the filter apparatus.

13. The exhaust filter system for a battery pack according to claim 1, wherein the exhaust filter system for a battery pack further comprises a fire coupling, and the fire coupling is connected to the discharge port of the filter apparatus.

14. The exhaust filter system for a battery pack according to claim 1, wherein the explosion-proof valve comprises a frame, a seal gasket, and a waterproof breathable film, the seal gasket and the waterproof breathable film are separately disposed on the frame, the seal gasket is used for a sealed connection between the explosion-proof valve and the battery pack, and the waterproof breathable film is used for pressure relief during thermal runaway in the battery pack.

* * * * *